Figure 3:
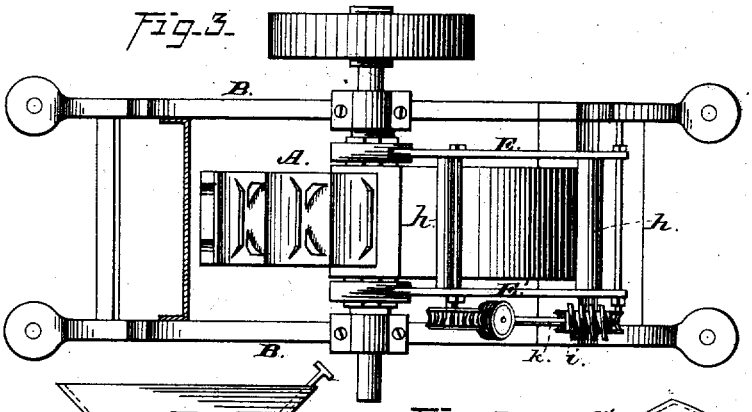

2 Sheets—Sheet 1.
M. B. ATKINSON,
Assignor of two-thirds interest to W. CAMMACK & G. W. DECKER.
Grinding-Mill.
No. 8,917. Reissued Sept. 30, 1879.
Fig. 1.
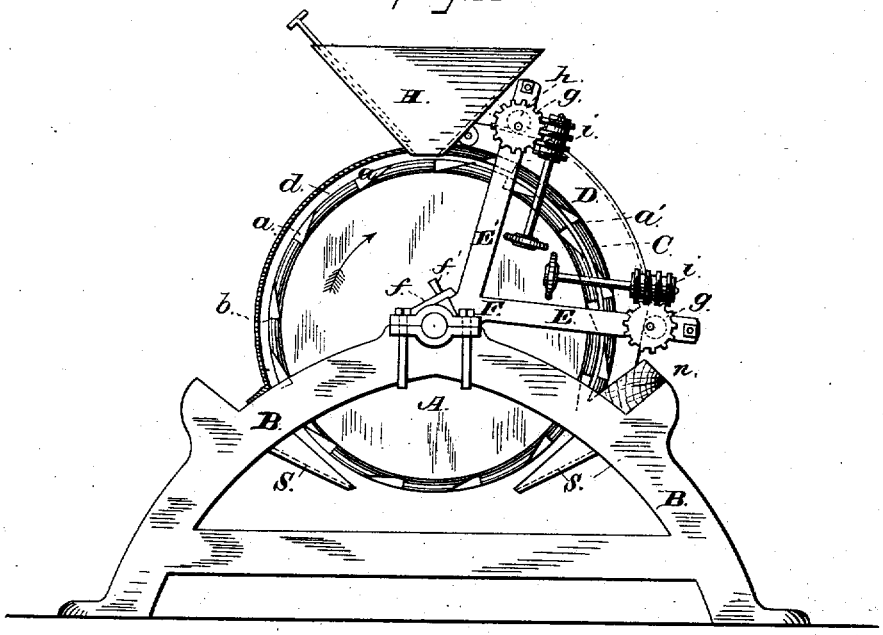
Fig. 2.
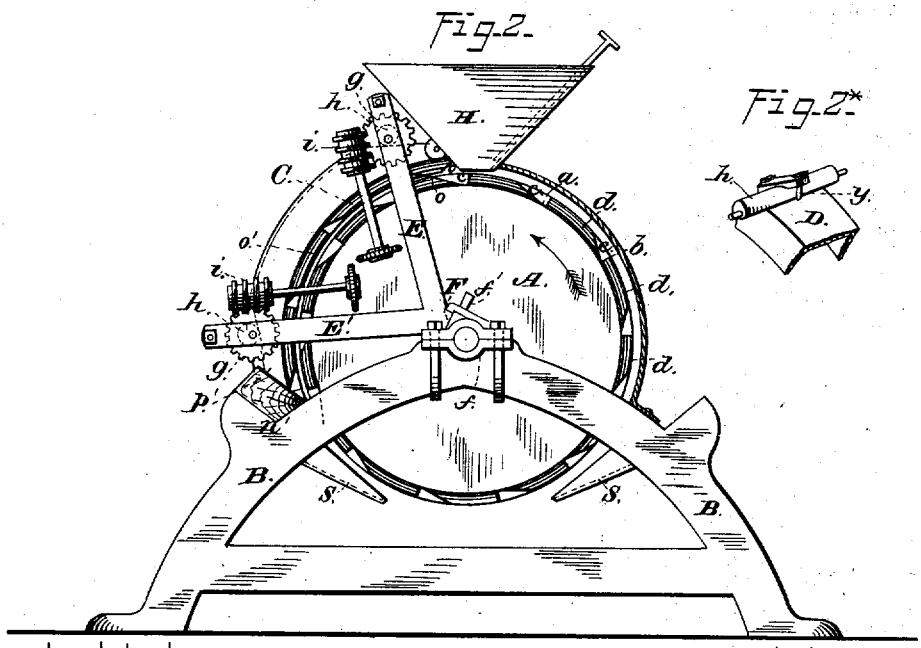
Fig. 2*.
WITNESSES:
Jas. E. Hutchinson.
J. A. Rutherford
INVENTOR.
Mahlon B. Atkinson,
by James L. Norris.
Attorney.
N. PETERS, PHOTO-LITHOGRAPHER, WASHINGTON, D. C.

M B. ATKINSON,

Assignor of two-thirds interest to W. CAMMACK & G. W. DECKER.

Grinding-Mill.

No. 8,917. Reissued Sept. 30, 1879.

WITNESSES:

Jas. E. Hutchinson.

J. A. Rutherford.

INVENTOR.

Mahlon B. Atkinson, by James L. Norris.

Attorney.

N. PETERS, PHOTO-LITHOGRAPHER, WASHINGTON, D. C.

UNITED STATES PATENT OFFICE.

MAHLON B. ATKINSON, OF SHARPSBURG, MARYLAND, ASSIGNOR OF TWO-THIRDS INTEREST TO WILLIAM CAMMACK AND GEORGE W. DECKER, OF WASHINGTON, DISTRICT OF COLUMBIA.

IMPROVEMENT IN GRINDING-MILLS.

Specification forming part of Letters Patent No. 206,996, dated August 13, 1878; Reissue No. 8,917, dated September 30, 1879; application filed August 19, 1879.

*To all whom it may concern:*

Be it known that I, MAHLON B. ATKINSON, of Sharpsburg, in the county of Washington and State of Maryland, have invented certain new and useful Improvements in Grinding-Machines, of which the following is a specification.

This invention relates to that class of mills in which a vertically-revolving circular stone having furrows across its periphery runs within a stationary concave stone, which is also transversely furrowed. Its object is to provide a mill having a capacity of production ranging from the coarsest granulation, as in the manufacture of hominy and cracked corn for horse-food, to the highest grade of wheat flour.

It has heretofore been necessary to use for granulating grain pairs of stones having a special dress not suited for flouring purposes or for making corn-meal, this necessity arising from the fact that a dress adapted to produce flour has a rubbing action upon the grain, and this action continues even though the stones be set so far apart as to but imperfectly crush the grain, so that with hominy, grits, or other granulated cereals produced by stones having a flouring-dress there has always been found a very objectionable percentage of flour.

The forms of dress especially adapted for producing clean granulation unmixed with flour have not, so far as I am aware, been capable of any adjustment for flouring. Separate pairs of stones, therefore, have always been essential to the successful and satisfactory performance of the two operations.

By my invention the necessity for differently-dressed pairs of stones is obviated.

It consists in the combination of a vertically-rotating cylindrical stone having on its periphery the millstone-dress consisting of transverse furrows with abrupt shoulders, lands, and feather-edges, substantially as described, and the concave stone provided with a similar dress, and adjustable circumferentially to reverse positions with respect to the dress of the cylindrical stone for the purpose of adapting the mill to either granulating or flouring purposes, substantially as hereinafter described and explained.

It consists, further, in a novel combination of devices for adjusting the concave to or from a cylindrical millstone; and, further, in an improved millstone-dress which prevents the grain from scattering from between the faces of a vertical millstone and its concave when the cylinder is rotated in either direction, as hereinafter set forth.

Figure 4:
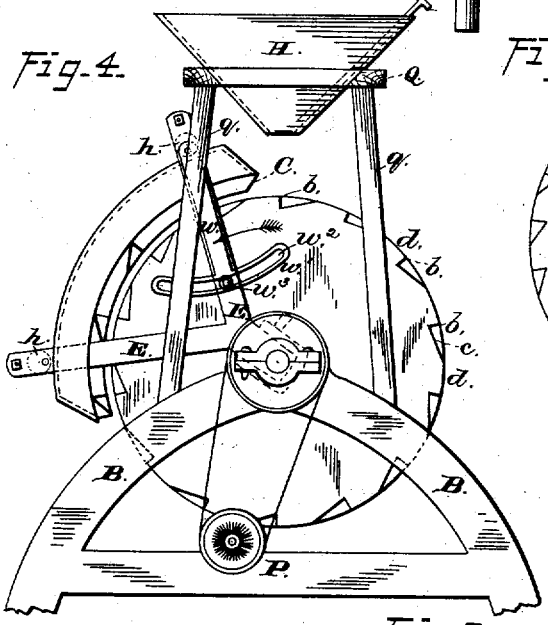
Figure 5:
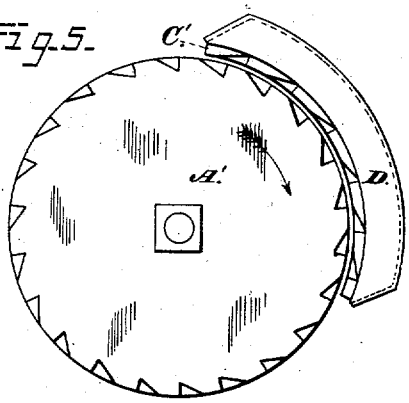
Figure 6:
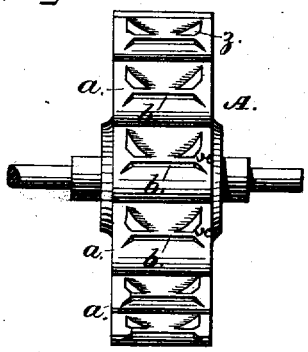
Figure 7:
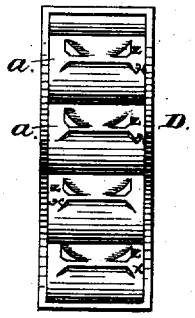
Figure 8:
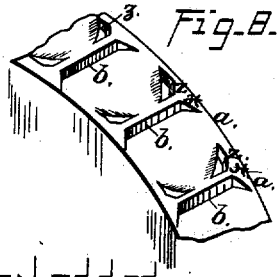

In the accompanying drawings, Figure 1 is a side elevation of my improved mill arranged for granulating or cracking grain. Fig. 2 is a similar view, showing the stones arranged for flouring or mealing. Fig. 2* is a detail view of the adjusting-eccentric. Fig. 3 is a plan view. Fig. 4 is a view in elevation, illustrating a modification of the hopper-support, and also of the concave-adjusting devices. Fig. 5 illustrates a modified form especially adapted for granulating wheat. Fig. 6 is a face view of the cylindrical stone. Fig. 7 is a face view of the concave, and Fig. 8 is a perspective view of a segment of the face of the cylindrical stone.

The letter A indicates a vertically-rotating cylindrical grinding-stone, which may be made of burr-stone or metal with chilled face, mounted in bearings upon a frame, B, and having furrows *a* across its periphery. These furrows are, in practice, about one-sixteenth ($\frac{1}{16}$) of an inch deep, having each one abrupt wall or shoulder, *b*, an inclined face, *c*, about three-fourths of an inch in extent, terminating at a land, *d*, of about the same length, reaching to the shoulder of the next furrow. The shoulders of the furrows do not extend entirely across the face of the wheel, but terminate usually about half an inch from each edge, and are then beveled outward, as at *x*, decreasing in height and, in the space of about one-quarter of inch, vanishing on the adjacent inclined face. Immediately behind the beveled portion of the shoulder of each furrow is cut a short beveled shoulder, *z*, and having extensions parallel with the main furrow and with the edge of the stone, these extensions gradually decreasing in height and vanishing on the land. The purpose of beveling the shoulders at their ends and of the inclined short shoulders *z* is to direct the grain inward from the edges of the stone and prevent its scattering out from between them.

A concave stone, C, has its inner face dressed in the same manner and arranged opposite to the periphery of the stone A. This concave stone C has its outer portion secured in a casing, D, at the opposite ends, and on both sides of which extend two arms, E E′, branching at right angles from an arm, F, which is mounted on shaft of stone A, and held in place by a gib, *f*, and key *f′*. Near the outer end of each arm E E′ is mounted a worm-wheel, *g*, on an eccentric-shaft, *h*, and gearing with each of these worm-wheels is a worm, *i*, on the end of a shaft, *k*, mounted in a bearing arranged upon the side of casing D. The inner ends of these shafts *k* are provided with wheels *l*, by which they may be turned.

The casing D fits and is movable between the arms E E′ at its ends, and the turning of the worm *i* causes the said casing and the stone C inclosed therein to be moved closer to or farther from the cylindrical stone, as desired. As the distance between the arms E E′ increases toward their outer ends, the outward shifting of the stone C would loosen the threads of the worms *i* in the teeth of the wheels *g*, or entirely detach said worms and wheels, were not some provision made to prevent it; and it is for this reason that the wheels *g* are mounted on eccentric axes, which are arranged to turn toward the worms as the stone moves outward, as will be readily understood. Upon the outer surface of the casing D are studs *y* on both sides of the eccentric-shafts, the tops of these studs being connected by a cross-bar having its under side concaved and forming a top bearing for the eccentric shaft or roller, so that it may carry the stone outward.

In the modification shown in Fig. 4 the journals of the eccentric shafts or rollers project through the arms E E′, and have attached arms *w*, provided with segmental cross-arms $w^1$, having longitudinal slots $w^2$. Through these slots extend thumb set-screws $w^3$. By loosening these screws the segments $w^1$ may be adjusted in any direction, and the throw of the eccentric-shafts changed to adjust the concave.

The hopper H is provided with ears *m* at its opposite sides, by which it is detachably secured by suitable screws to one end of the casing, in position to feed the grain between the stones.

In Fig. 1 the stones are shown in position for granulating the grain with a clean fracture without producing flour. As the grain drops upon the stone A, revolving in the direction indicated by the arrow, it is caught by shoulder *a* of a furrow in stone A and carried forward, striking the shoulder *a′* of the concave; then the fragments falling into the furrow are not rubbed or powdered between two surfaces, but are only broken again when projecting sufficiently to strike another shoulder of the concave, finally falling out through spout *s*. By this arrangement hominy of any degree of fineness, or any other granulated or cracked grain, is produced without any admixture of flour.

Now, when it is desired to make flour or meal, the hopper is removed from casing D, as shown in Fig. 1, and the arms E E′ turned to the position shown in Fig. 2, or to the opposite side of the stone A, the end *p′* of the casing resting upon the bar *n′*, as the end *p* rests upon bar *n* in Fig. 1. The hopper is then secured to the upper end of the casing. The parts now being in the position as shown in Fig. 2, the direction of rotation of the stone A is to be changed by any suitable means, as, for instance, twisting the driving-belt so that the stone will travel in the direction of the arrow indicated thereon. Now, when the grain falls from the hopper it is carried by the feather-edge *o′* of the furrow against the feather-edge *o* of the furrow of the concave, crushed and rubbed between the lands of the two stones, and a flour produced the fineness of which depends upon the distance apart to which the stones are adjusted. This arrangement of the stones may be used also for finishing fine grades of grits.

In grinding wheat flour it produces a large percentage of middlings, and separates the gluten, or most nutritious and valuable portion of the grain, so perfectly from the husk as to make a grade of flour similar to that resulting from what is known as the "new process," and dispenses with the use of middlings-purifiers necessary in said process, thus greatly economizing labor and expense of machinery.

In the modification shown in Fig. 5, which I prefer to use in granulating wheat or making wheaten grits, the furrows of both stones are in the same direction, the stone A′ turning in the direction of the arrow. When the wheat falls from the hopper into a furrow of stone A′ it is carried by the feather-edge against the shoulder of the next furrow of the concave C′, and when there broken a portion of the grain is held by the shoulder until struck and again broken by the next succeeding feather-edge of a furrow of stone, A′, and the other portion is carried forward to be rebroken upon a shoulder of C′, so that, it will be seen, the shoulders of C′ and feather-edges of A′ act at least twice upon the same grain, or until it is broken sufficiently fine to pass between the lands of the two stones, the distance apart of which governs the fineness of the product.

In the modification shown in Fig. 4 the hopper is supported in a square frame, Q, supported on posts *q* extending upward from the frame. In this modification it is not necessary to remove the hopper in changing the position of the concave.

A revolving brush, P, operated by a belt from a pulley on the shaft of the cylindrical stone, is arranged across the bottom of this stone, and serves to keep it clean.

What I claim as my invention is—

1. The combination of a vertically-rotating cylindrical stone having on its periphery the millstone-dress consisting of transverse furrows with abrupt shoulders, lands, and feather-edges, substantially as described, and a concave stone provided with a similar dress and adjustable circumferentially to reverse positions with respect to the dress of the cylindrical stone, for the purpose of adapting the mill to either granulating or flouring purposes, substantially as set forth.

2. The combination of a suitable cylindrical grinding-stone and a suitable grinding concave for grinding and reducing grain, said concave being mounted on a supporting-frame capable of being shifted, with the concave, to either side of the grinding-face of the cylindrical stone.

3. The combination of the cylindrical stone A and the concave C, mounted in a swinging frame composed of the arms E E′ and arm F, pivoted on the axle of said cylindrical stone, and adapted to be shifted to opposite sides of said stone, and the stone-supporting frame provided with the bars *n n′*, for supporting and limiting the curvilinear movement of the concave, substantially as and for the purpose set forth.

4. The combination of the stone C, arms E E′, carrying the eccentrically-mounted worm-wheels *g*, and the operating-worms, substantially as described.

5. The vertically-rotating stone having on its periphery the transverse shoulders *b*, having extensions inclined outward at their ends toward the edges of the stone, and provided with the short shoulders *z* cut in the lands, and inclined oppositely to the inclined extensions of the main shoulders, substantially as and for the purpose set forth.

In testimony whereof I have hereunto set my hand in the presence of two witnesses.

M. B. ATKINSON.

Witnesses:
JAMES L. NORRIS,
JAMES A. RUTHERFORD.